US012618280B2

(12) United States Patent
Alexander

(10) Patent No.: US 12,618,280 B2
(45) Date of Patent: May 5, 2026

(54) RIGID WINDOW REGULATOR FOR AUTOMATED INSTALLATION

(71) Applicant: BROSE FAHRZEUGTEILE SE & CO. KOMMANDITGESELLSCHAFT, BAMBERG, Bamberg (DE)

(72) Inventor: Shane Alexander, Ortonville, MI (US)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 0 days.

(21) Appl. No.: 18/787,541

(22) Filed: Jul. 29, 2024

(65) Prior Publication Data

US 2026/0028867 A1 Jan. 29, 2026

(51) Int. Cl.
| | |
|---|---|
| *E05F 15/689* | (2015.01) |
| *B60J 5/04* | (2006.01) |
| *E05F 11/48* | (2006.01) |

(52) U.S. Cl.
CPC .......... *E05F 15/689* (2015.01); *B60J 5/0402* (2013.01); *E05F 11/483* (2013.01); *E05F 15/6909* (2024.01); *E05Y 2201/654* (2013.01); *E05Y 2201/664* (2013.01); *E05Y 2900/55* (2013.01)

(58) Field of Classification Search
CPC ..... E05F 15/689; E05F 15/692; E05F 15/695;
E05F 15/697; E05F 11/483; E05F 11/488;
E05F 11/481; E05F 15/6909; E05F
15/6916; B60J 5/0402
USPC ..................................................... 49/352, 349
See application file for complete search history.

(56) References Cited

U.S. PATENT DOCUMENTS

| | | | | |
|---|---|---|---|---|
| 5,946,858 A | * | 9/1999 | Staser | E05F 11/488 |
| | | | | 49/502 |
| 6,397,524 B1 | * | 6/2002 | Sakaguchi | E05F 11/385 |
| | | | | 49/502 |
| 6,820,370 B2 | * | 11/2004 | Marscholl | E05F 11/483 |
| | | | | 49/502 |
| 11,377,896 B2 | * | 7/2022 | Fanucchi | H02P 6/08 |
| 2003/0009948 A1 | * | 1/2003 | Nishikawa | E05F 11/485 |
| | | | | 49/502 |

* cited by examiner

*Primary Examiner* — Marcus Menezes
(74) *Attorney, Agent, or Firm* — Dickinson Wright PLLC

(57) ABSTRACT

A window regulator for use in a vehicle and configured to move a windowpane between an open position and a closed position. The window regulator including a first guide rail, a second guide rail, a first slider, a second slider, and a cross-brace assembly. The first slider configured to move along the first guide rail and the second slider configured to move along the second guide rail to collectively move the windowpane between the open position and the closed position. The cross-brace assembly extending between and rigidly connecting the first guide rail to the second guide rail.

4 Claims, 9 Drawing Sheets

102

104, 106

114, 116

172'

192

104, 106

114, 116

172

RIGID WINDOW REGULATOR FOR AUTOMATED INSTALLATION

TECHNICAL FIELD

The present disclosure relates to a window regulator for use in a motor vehicle and a method of installing the same to a vehicle closure, in particular by a robotic assembly process.

BACKGROUND

Vehicles may include a mechanism such has a window lifter or window regulator configured to support and carry a windowpane between a first position, e.g., a bottom position, disposed within a cavity of the door or other vehicle member, and a second position e.g. top position, engaged with an upper portion of the door or roof.

SUMMARY

According to one embodiment, a window regulator for use in a vehicle and configured to move a windowpane between an open position and a closed position is provided. The window regulator may include a first guide rail, a second guide rail, a first slider, a second slider, and a cross-brace assembly. The first slider may be configured to move along the first guide rail and the second slider may be configured to move along the second guide rail to collectively move the windowpane between the open position and the closed position. The cross-brace assembly may extend between and rigidly connect the first guide rail to the second guide rail.

According to another embodiment, a method of installing a window regulator to a vehicle closure is provided. The window regulator may include a pair of guide rails and a pair of sliders operatively connected to a gearbox assembly by one or more cables, the pair of sliders collectively configured to move along the pair of guide rails to move a windowpane between an open position and a closed position. The method may include: attaching a first cross-brace member to a first guide rail and a second guide rail of the pair of guide rails; attaching a second cross-race member to the first guide rail and the second guide rail; grasping, by a robot, the window regulator assembly; and fixing, by the robot, the window regulator assembly to at least one door panel of the vehicle closure.

According to yet another embodiment, a method of installing a window regulator to a vehicle closure is provided. The window regulator may include a pair of guide rails and a pair of sliders operatively connected to a gearbox assembly by one or more cables. The pair of sliders may be configured to move along the pair of guide rails to move a windowpane between an open position and a closed position. The method may include: attaching a first cross-brace member to a first guide rail and a second guide rail of the pair of guide rails; attaching a second cross-race member to the first guide rail and the second guide rail to form a rigid window regulator assembly, the rigid window regulator assembly including the window regulator; grasping and placing, by a robot, the rigid window regulator assembly on a panel of the vehicle closure; fixing, by the robot, the rigid window regulator assembly to the panel of the vehicle closure; and removing by the robot, the first cross-brace member from the rigid window regulator assembly.

DETAILED DESCRIPTION

Figure 1A:
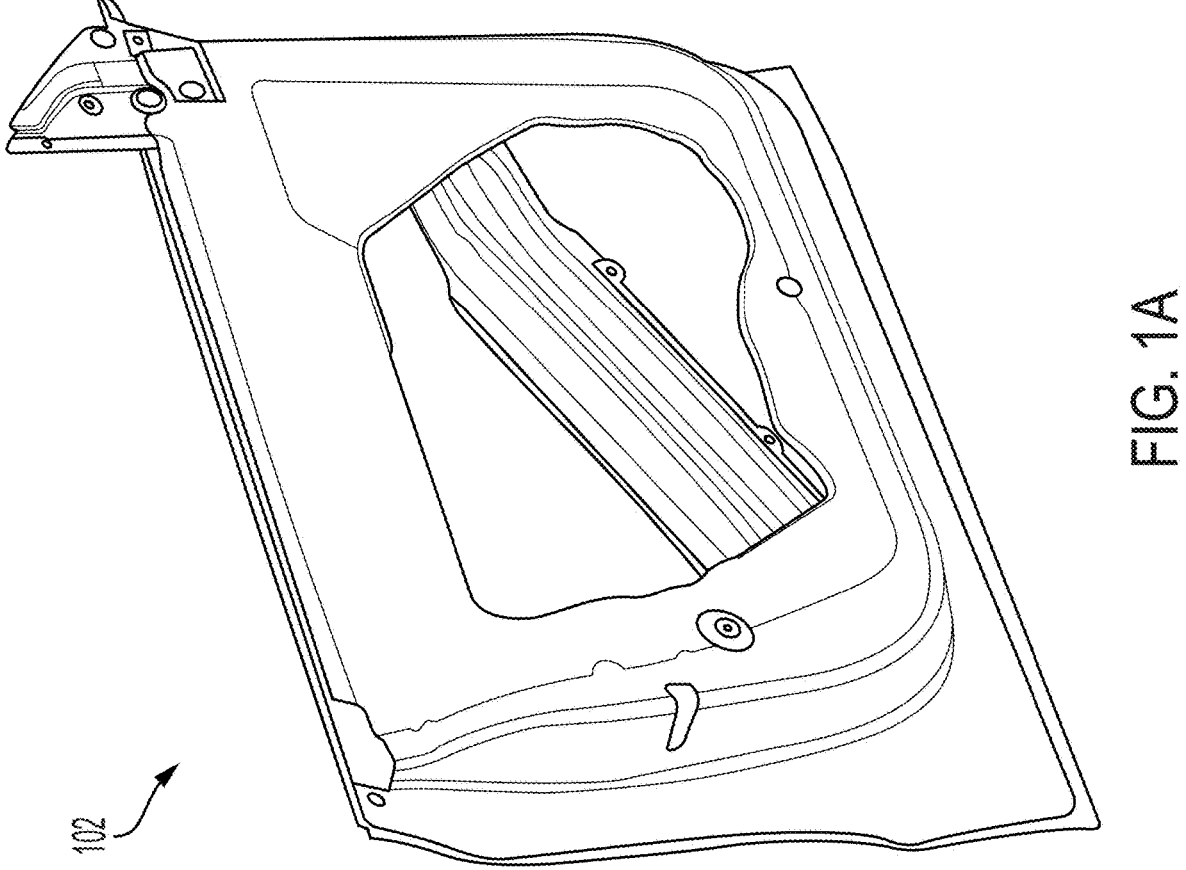
FIG. 1 illustrates a perspective view of an exemplary installation process for installing a rigid window regulator to a vehicle door.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A conventional window regulator may include a pair of guide rails each of which are fixed to one or more panels of a vehicle closure (e.g., vehicle door). The installation of these conventional window regulators are generally accomplished by manual installation in which a human operator or assembler grasps and places the pair of guide rails onto on to one of the door panels and then securing each guide rail to the door panel by the use of one or more mechanical fasteners. Because the pair of guide rails are generally connected by flexible cables (e.g., Bowden cables) operatively connected together by a drum housing, each of the guide rails may be moved relative to one another by the operator so that the window regulator may be inserted through an opening in one or more of the panels prior to securing the window regulator to the one or more door panels.

Under certain circumstances, such as when the window regulator is to be installed by a non-manual or automated process (e.g., robotic installation), the ability to manipulate the position of the guide rails relative to one another may be a hindrance to an automated installation process. For example, if one or more robots are tasked with installing the window regulator, the relative position of the guide rails must be substantially fixed or constant so that the robot may grasp, place and secure the pair of guide rails to the one or more panels of the vehicle closure.

The present disclosure attempts to address one or more of the above-mentioned problems.

Figure 1C:
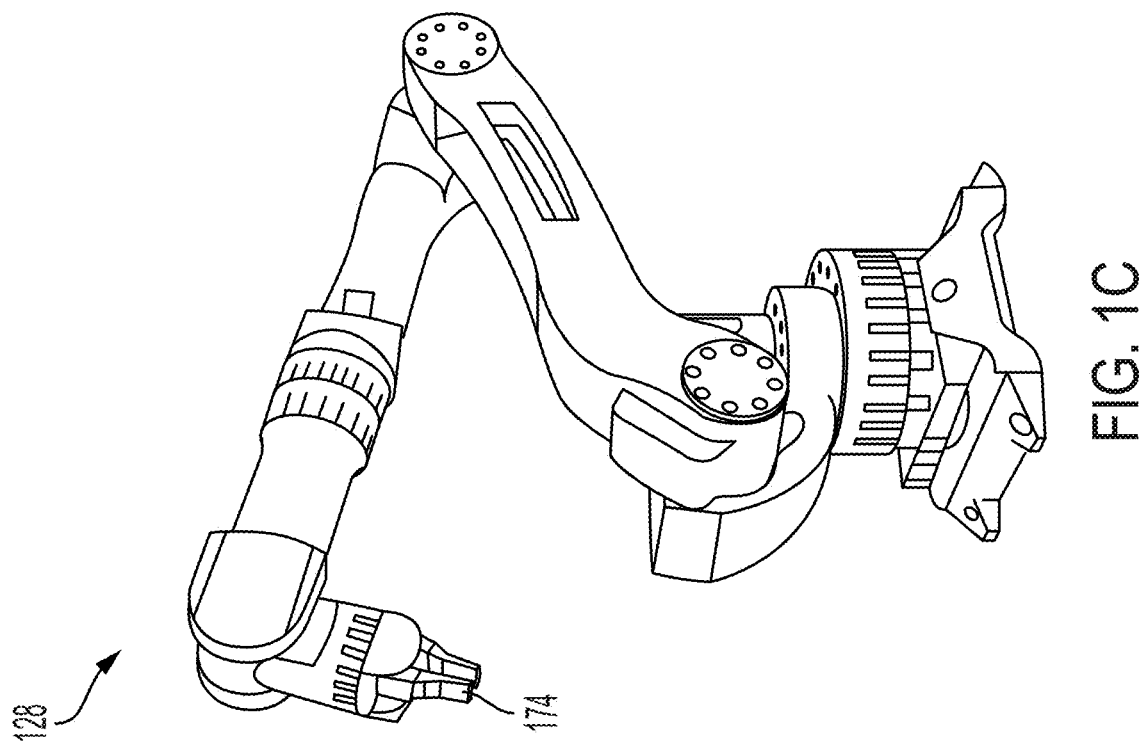
Figure 1B:
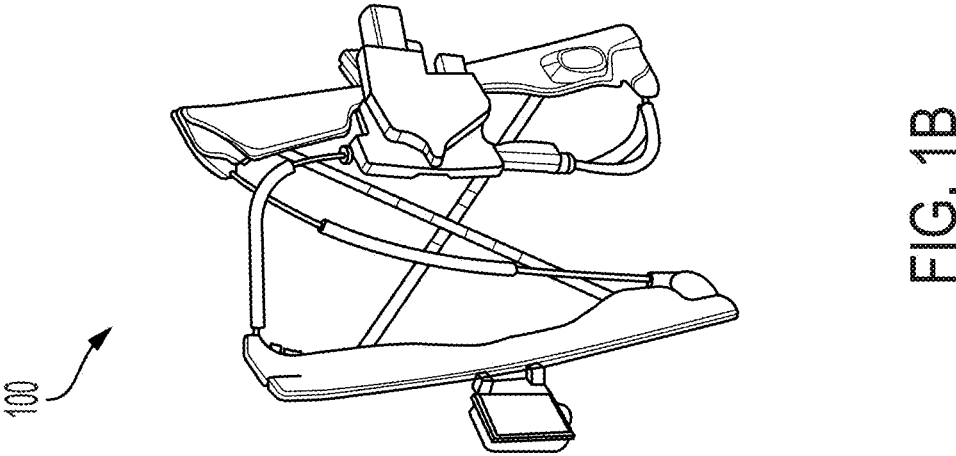
Figure 2A:
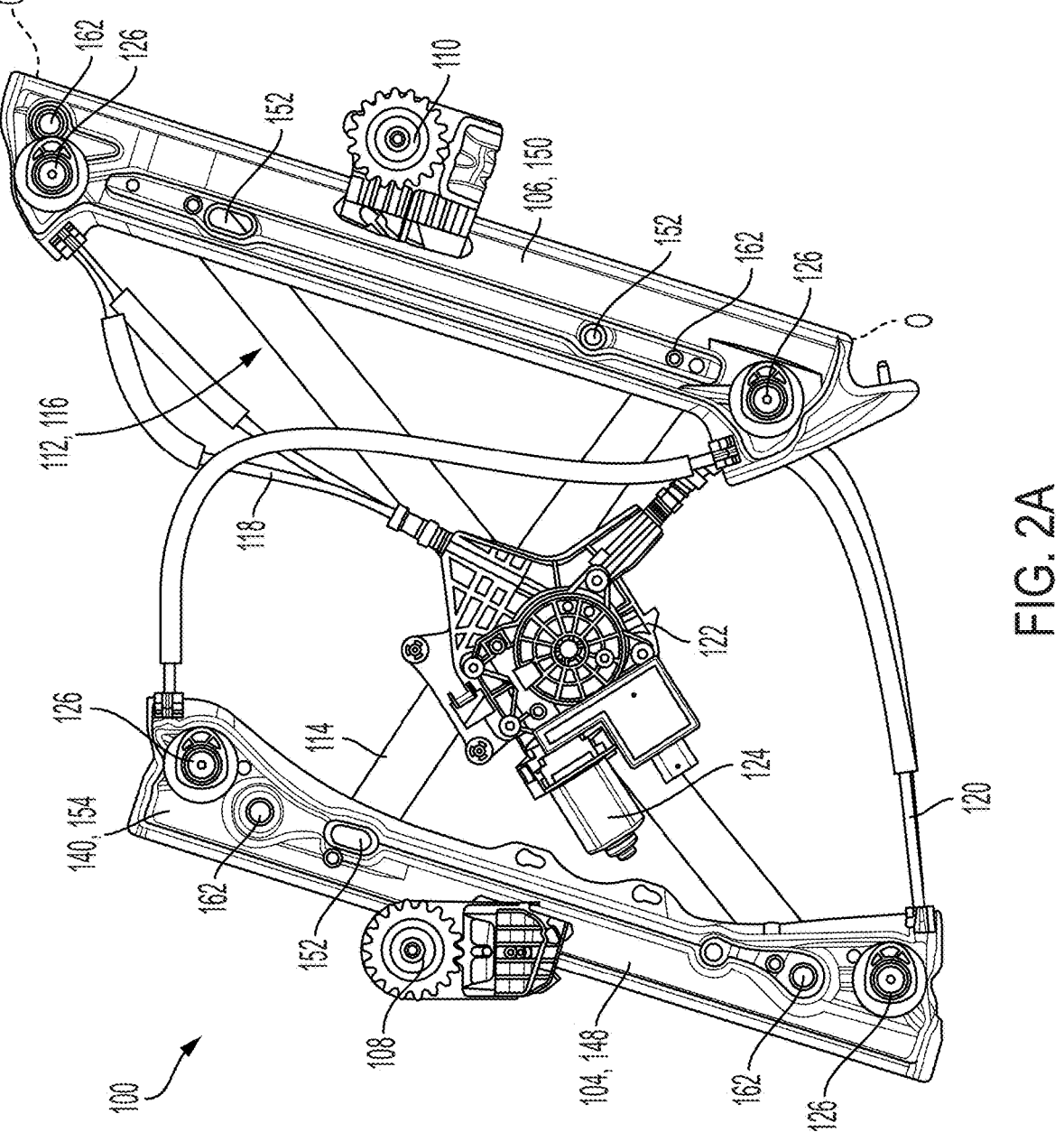
FIG. 2A illustrates a front plan view of the rigid window regulator illustrated in FIG. 1.
Figure 2B:
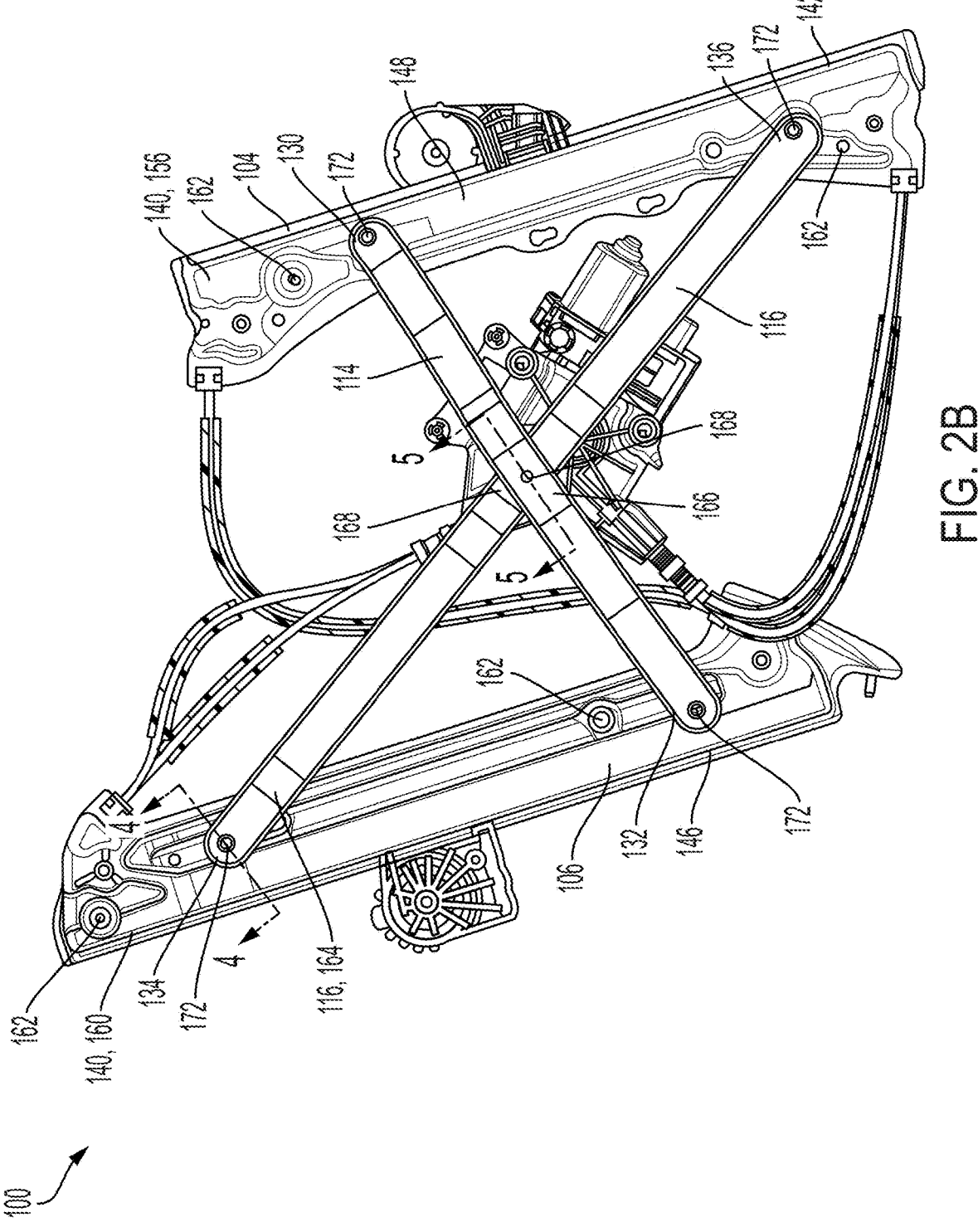
FIG. 2B illustrates a rear plan view of the rigid window regulator illustrated in FIG. 1.

FIG. 1 illustrates a perspective view of an exemplary assembly process for installing a window regulator such as a rigid dual guide rail window regulator 100 to a vehicle closure 102. FIG. 2A illustrates a front-plan view of the window regulator 100 and FIG. 2B illustrates a rear-plan view of the window regulator 100. As will be described in greater detail below, the window regulator 100 may be configured for an automated assembly process to attach the window regulator 100 to the vehicle closure 102 by, for example, one or more robotic devices including a robotic arm 128. The use of an automated assembly process may facilitate more efficient and less expensive manufacturing costs, in particular with respect to the savings in manual labor.

The window regulator 100 may include a pair of guide rails including a first guide rail 104 and a second guide rail 106 that may be spaced apart and arranged substantially parallel to the first guide rail 104. A first slider 108 may be disposed on and configured to move (e.g., translate) along the first guide rail 104 and a second slider 110 may be disposed on and configured to move (e.g., translate) along the second guide rail 106. The window regulator 100 may include a drum housing 122 and one or more cables (e.g., Bowden cables) such as a first cable 118 and a second cable 120 that are operatively connected to the drum housing 122 and the first and second sliders 108, 110. A motor 124 may be fixed to or disposed within the drum housing 122 and configured to wind and unwind the first and second cables 118, 120 to move the windowpane (not illustrated) between an open position, represented by dashed line O, and a closed position represented by dashed line C.

The first guide rail 104 and the second guide rail 106 may be rigidly connected to one another by a cross-brace 112 that may include a first brace 114 and a second brace 116. In one or more embodiments, the cross-brace 112 may be detachably connected to each of the guide rails 104, 106 so that after the window regulator 100 is installed or assembled to the vehicle closure 102, the cross-brace 112 may be removed without permanently damaging (e.g., breaking, bending, or otherwise permanently deforming either the cross-brace 112 or the first and second guide rails 104, 106. According to another embodiment, the cross-brace 112 may be permanently connected to the first and second guide rails 104, 106 so that removal of the cross-brace would likely result in at least some damage (e.g., breaking, bending, or permanently deforming) either the first and second braces 112, 114 or the first and second guide rails 104, 106.

The first guide rail 104 includes a first side 154 and a second side 156 that opposes the first side 154. The first guide rail 104 includes an upper end region 140, a lower end region 142, and a medial region 148 extending between the upper end region 140 and the lower end region 142. A pulley 126 may be disposed one the first side 154 and within the upper end region 140 and the lower end region 142 of the first guide rail. The second guide rail includes a first side 158 and a second side 160 that opposes the first side 158 of the second guide rail 106. The second guide rail 106 includes an upper end region 144, a lower end region 146, and a medial region 150 extending there between. A pulley 126 may be disposed on the second side of the second guide rail 106 and disposed within the upper end region 144 and the lower end region 146. The pulleys 126 are configured to guide the first and second cables 118, 120 and provide a mechanical advantage while raising the windowpane between the open and closed positions.

In one or more embodiments, the cross-brace 112 may be disposed on the second sides 156, 160 of the first and second guide rails 104, 106. The first brace 114 may include a first end portion 130 and a second end portion 132 and the second brace 116 may include a third end portion 134 and a fourth end portion 136. The first end portion 130 may lie along one or more portions of the second side 156 of the first guide rail 104, such as within the upper end region 140 or the medial region 148 of the first guide rail 104, and the second end portion 132 of the first brace 114 may lie along one or more portions of the second side 160 of the second guide rail 106, such as within the lower end region 146 of the second guide rail 106. The third end portion 134 of the second brace 114 may lie along one or more portions of the second side 160 of the second guide rail 106, such as within the upper end region 140 of the first guide rail 104, and the fourth end portion 136 may lie along one or more portions of the second side 156 of the first guide rail 104, such as the lower end region 142 of the first guide rail 104. Each of the end portions 130, 132, 134, 136 may be configured to receive or cooperate to provide a permanent or detachable connection 172 between the first and second braces 114, 116 and the first and second guide rails 104, 106.

Alternatively or additionally, the first brace 114 and the second brace 116 may include one or more bends or bent portions 164 to enable attachment to each of the guide rails 104, 106 while providing for sufficient space to attach the drum housing 122 or sufficient space to grasp and place the guide rails 104, 106 onto one or more door panels of the vehicle closure 102. In one or more embodiments, the first brace 114 and the second brace 116 may each include a planar portion or flat 166, 170, respectively. The flat 170 of the second brace 116 may lie along one or more portions (e.g., a central region) of the drum housing 122 and may be sandwiched between the drum housing 122 and the flat 166 of the first brace 114. As will be described in greater detail below, the flat 170 of the second brace 116 and the flat 166 of the first brace 114 may be fixed to one another, fixed to the drum housing 122, or both by one or more drum housing attachment features 168.

In one or more embodiments, the cross-brace 112 may be composed of an extruded or stamped aluminum or a steel material that may be rolled or stamped. The thickness of the first and second braces 112, 114 may range between 0.7 to 1.5 mm, and the first and second guide rails may be formed of one or more similar materials having a thickness ranging between 1 mm and 1.5 mm, though other suitable thicknesses may be used. The first and second guide rails 104, 106 may each include one or more apertures that are configured for grasping (e.g., by the robotic arm 128) the window regulator 100 and assembling the window regulator 100 to the vehicle closure 102.

As an example, one or more slots or apertures 152 may be defined by the first and second guide rails 104, 106 so that an end effector 174 of the robotic arm 128 may be inserted into one or more of the slots 152 and engage an inner periphery of the same to enable the robotic arm 128 to grasp and place the window regulator onto the vehicle closure. Each of the guide rails 104, 106 may also define one or more vehicle closure attachment features or apertures 162. As one example, the vehicle closure attachment apertures 162 may be disposed between one pulley 126 and the apertures 152 configured for the robotic arm.

Figure 3:
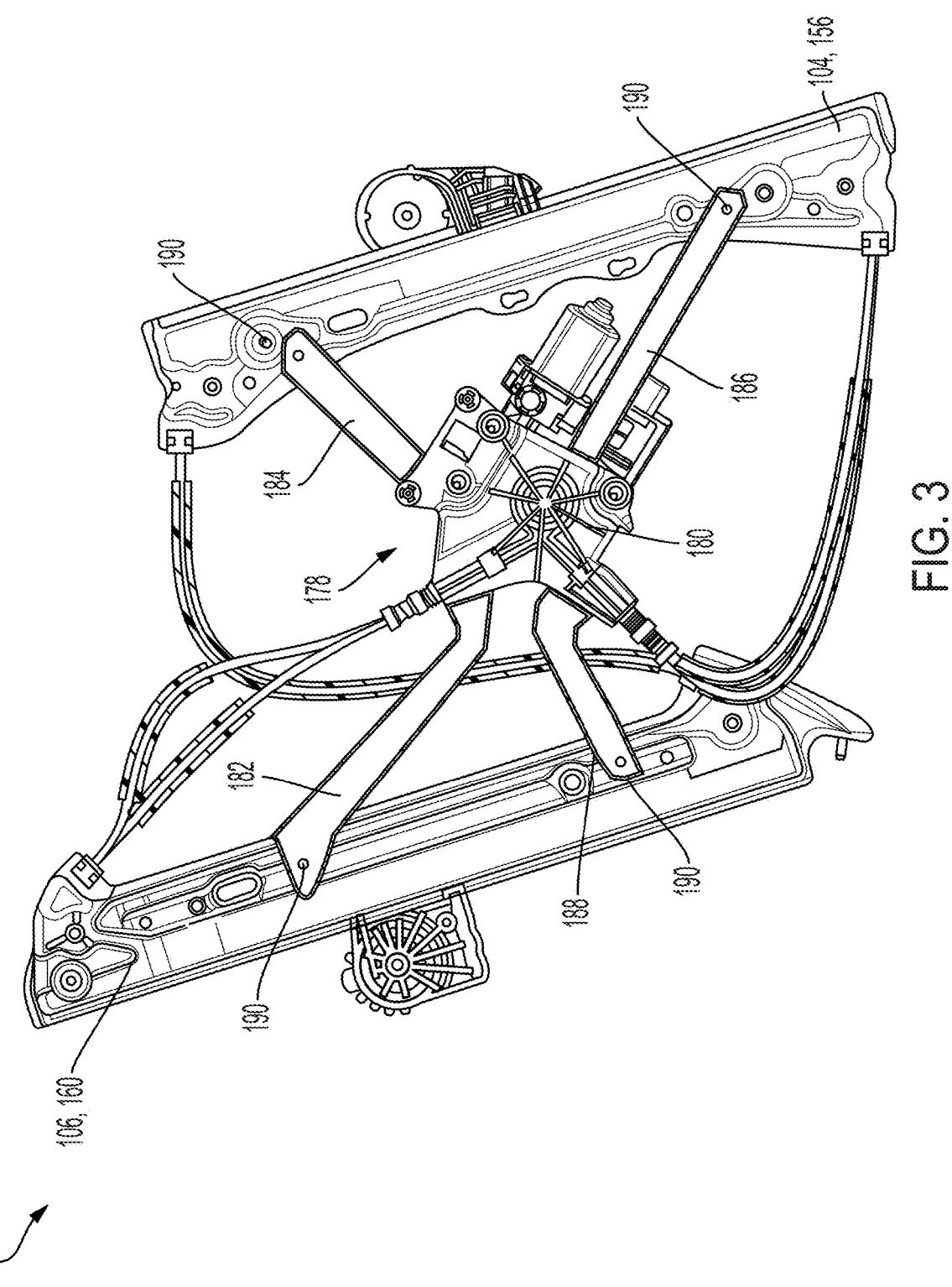
FIG. 3 illustrates a rear plan view of another rigid window regulator according to one or more embodiments.

FIG. 3 illustrates a rear plan view of a window regulator 178 according to another embodiment. The window regulator 178 includes the first guide rail 104 and the second guide rail 106 and for the purposes of brevity features of the guide rails 104, 106 and associated components that are common between the window regulator 100 and the window regulator 178 will not be described. The window regulator 176 includes a drum housing 180 provided with integrated arms 182, 184, 186, 188 that form a cross-brace 178. The cross-brace 178 and the integrated arms 182, 184, 186, 188 may be formed of one or more polymeric or plastic materials and the cross-brace 178 may be formed by one or more processes (e.g., injection molding, additive manufacturing). Each of the integrated arms may include one or more connection features 190 for attachment of the window regulator 176 to the vehicle closure 102.

Figure 4B:
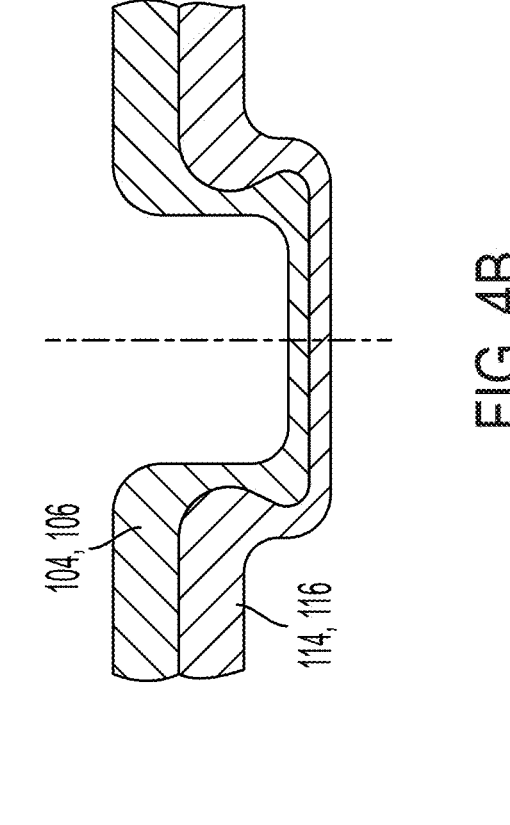
FIG. 4B illustrates a cross-sectional view of an exemplary fastening joint taken along lines 4-4 in FIG. 2A.
Figure 4A:
FIG. 4A illustrates a cross-sectional view of an exemplary fastening joint taken along lines 4-4 in FIG. 2A.
Figure 4A:
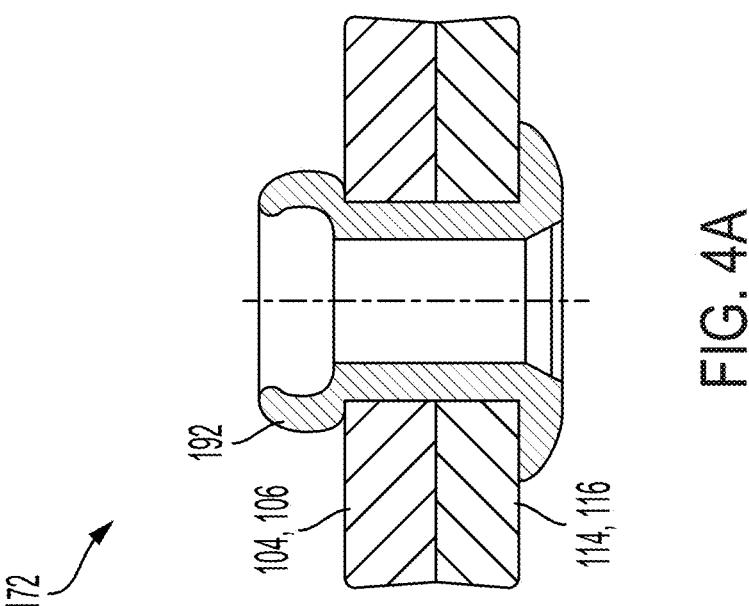
Figures 4C, 5:
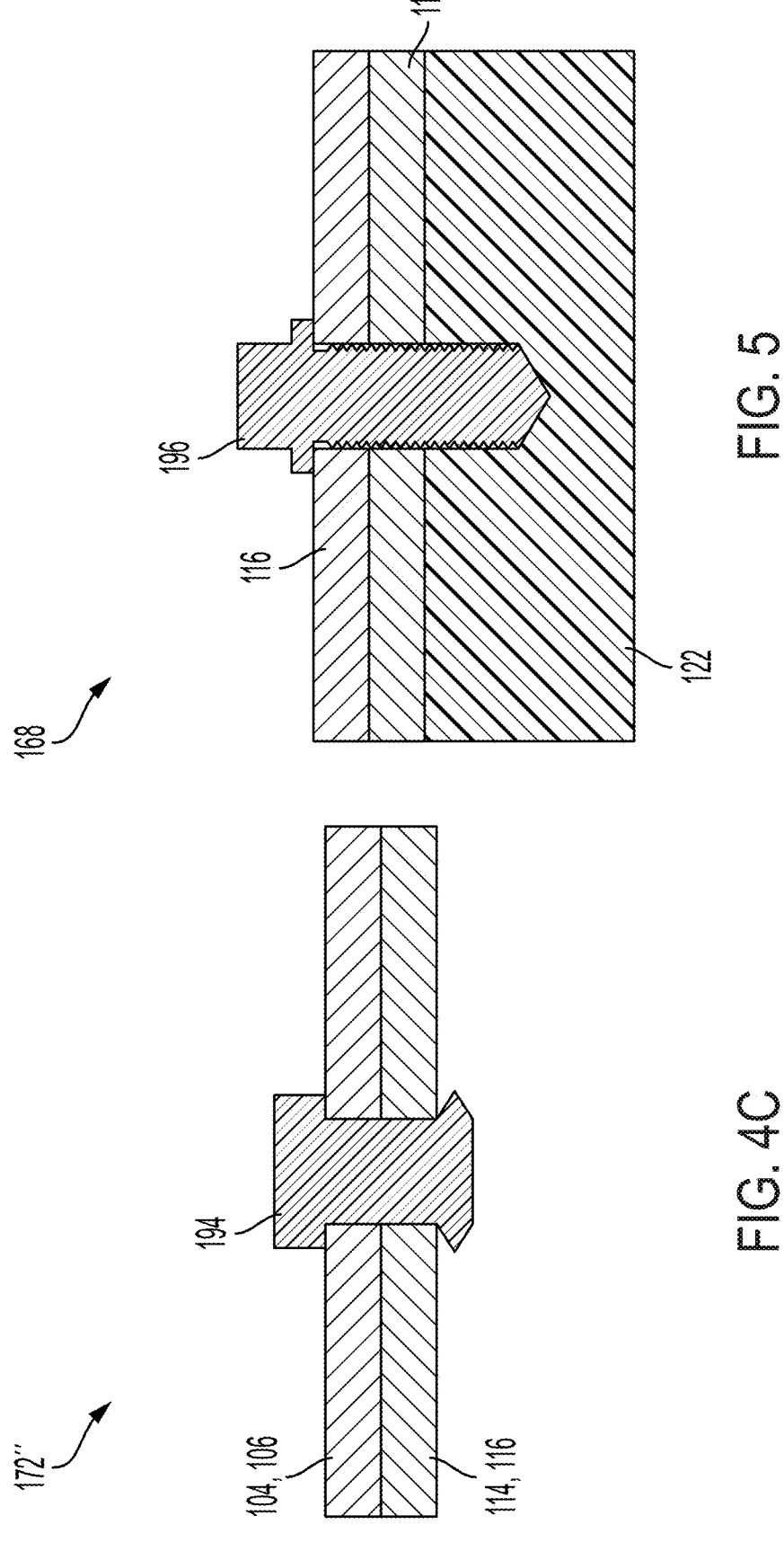
FIG. 4C illustrates a cross-sectional view of an exemplary fastening joint taken along lines 4-4 in FIG. 2A.
FIG. 5 illustrates a cross-sectional view of an exemplary fastening joint taken along lines 5-5 in FIG. 2B.

FIG. 4A illustrates a cross-sectional view of an exemplary permanent connection 172 between one of the cross braces 114, 116 and one of the guide rails 104, 106. As an example, a rivet 192 may be deformed to fix one or more of the cross braces 114, 116 to one or more of the guide rails 104, 106. FIG. 4B illustrates a cross-sectional view of another permanent connection 172' between one or more of the cross braces 104, 106 and the first and second cross braces 114, 116. As an example, the permanent connection 172' may be formed by a permanently and concentrically deforming one or more of the guide rails 104, 106 and one or more of the cross braces 114, 116 to facilitate interlocking of the materials in the joint. As one non-limiting example, the permanent and concentric deformation may be accomplished by the use of TOX®-Tools. FIG. 4C illustrates a cross-sectional view of an exemplary detachable connection 172". As one example, the detachable connection 172" may be formed by a press-fit fastener 194 that may be inserted into one or more guide rails 104, 106 and into one or more of the cross braces 114, 116. The press-fit fastener 194 may be formed of a plastic or polymeric material and may be configured to be removed without permanently damaging either of the one or more guide rails 104, 106 or the one or more cross-braces 114, 116.

FIG. 5 illustrates a cross-sectional view of an exemplary connection 168 between the first and second cross-braces 114, 116 and the drum housing 122. As one example, a fastener (e.g., bolt, self-tapping screw) 196 provided with a washer or a flange head may extend through apertures defined by the first and second cross-braces 114, 116 and thread into the drum housing 122.

Figures 6, 6A:
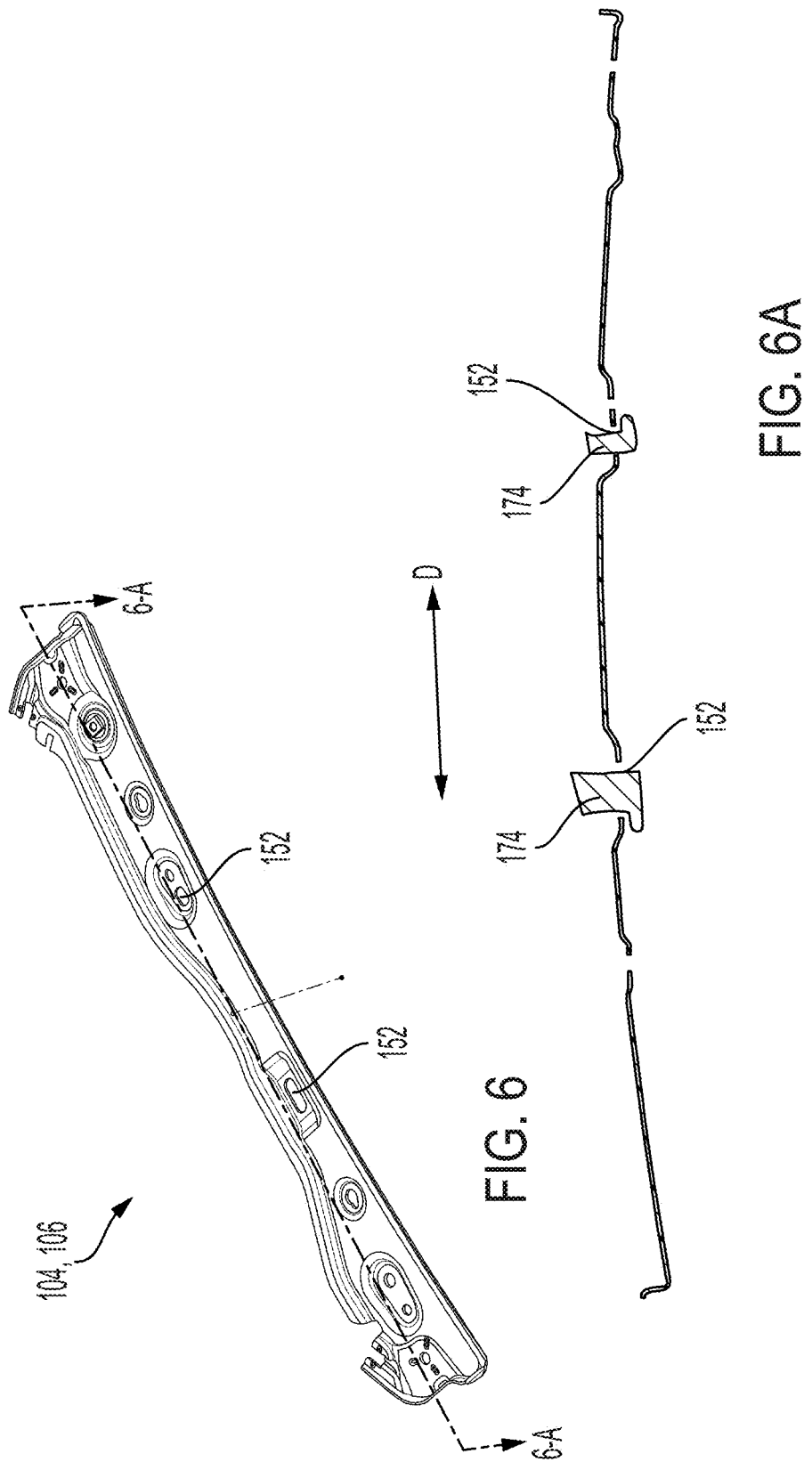
FIG. 6 illustrates a perspective view of a guide rail of the rigid window regulator according to one or more embodiments.
FIG. 6A illustrates a cross-sectional view of the guide rail taken along lines 6-A in FIG. 6.

FIG. 6 illustrates a perspective view of one of the guide rails 104, 106. FIG. 6A illustrates a cross-sectional view taken along lines 6-A in FIG. 6 provided with a schematic representation of the end effector 174. As described above, each of the guide rails 104, 106 may define one or more slots 152 that may be configured to receive and engage the end effector 174 of the robotic arm 128 (FIG. 1). As an example, the end effector 174 may be configured to move (e.g., rotate, move vertically, and horizontally) so that the end effector 174 may be inserted into the slots 152. The end effector 174 may then translate along the bi-directional arrow D so that the end effector 174 is enabled to secure the guide rail and the robotic arm 128 is enabled to lift and place the window regulator 100 into the vehicle closure 102.

Figure 7:
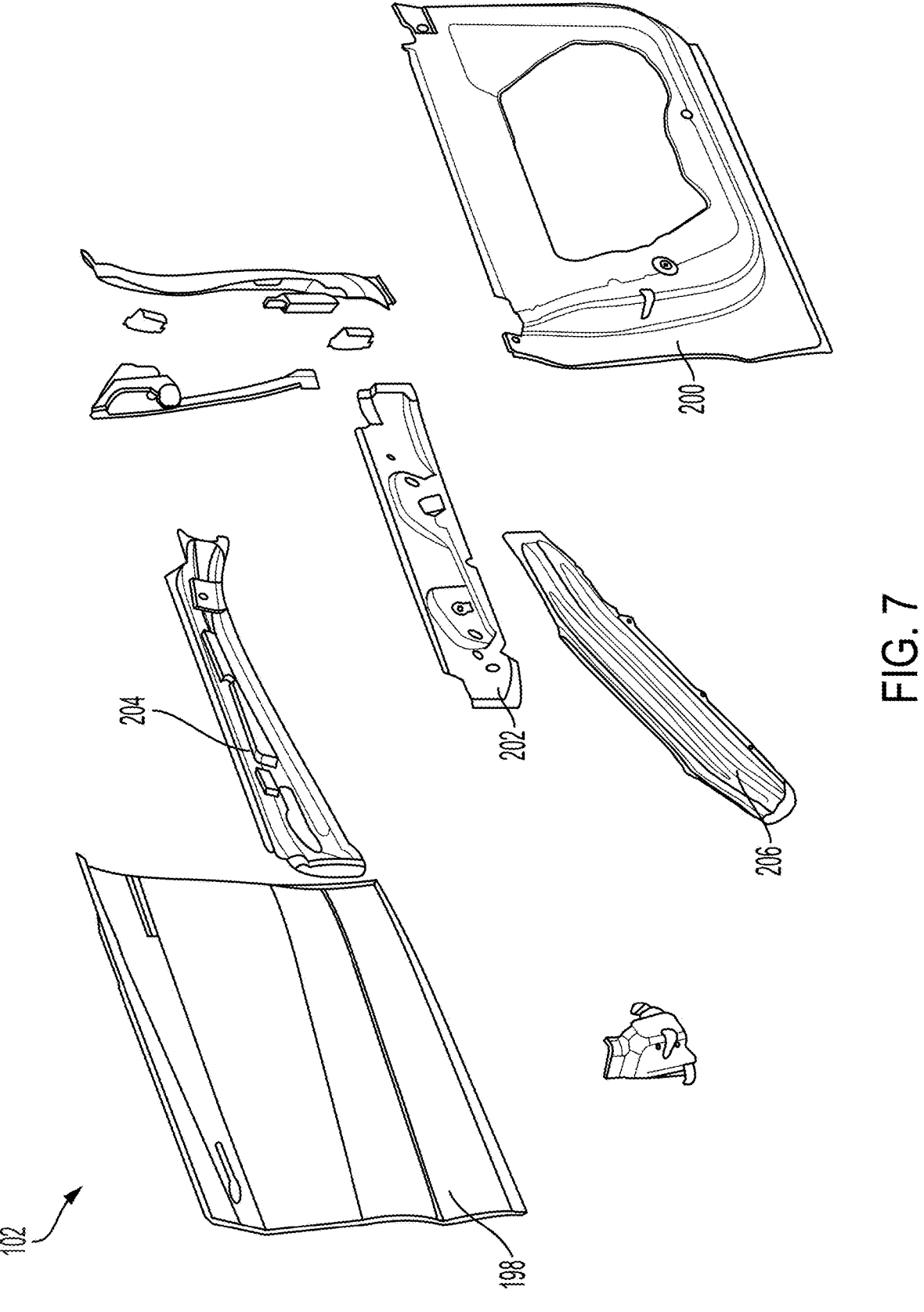
FIG. 7 illustrates a perspective exploded view of the vehicle closure shown in FIG. 1.

FIG. 7 illustrates a perspective-exploded view of the vehicle closure 102. The vehicle closure 102 may include an outer panel 198, a first cross member 202, a second cross member 204, and a third cross member 206. In one or more embodiments, the first cross member 202 may be attached to a lower end region of the outer panel, the second cross member may be attached to an upper end region of the outer panel 198, and the third cross member 206 may be fixed to the outer panel 198 and extend between the first cross member 202 and the second cross member 204. After fixing the first, second, and third cross members 202, 204, 206 to the outer panel 198, the window regulator 100 (FIG. 1) may be fixed to the outer panel 198 and one or more of the cross members 202, 204, 206. Upon fixing the window regulator 100 to the outer panel and/or cross members 202, 204, 206, the inner panel 200 may be fixed to the outer panel 198 and one or more of the cross members 202, 204, 206. Alternatively, the window regulator 100 and the robotic arm 128 may be collectively configured to install the window regulator 100 after the inner panel 200 is fixed to the outer panel 198 and one or more of the cross members 202, 204, 206.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

100 window regulator
102 vehicle closure
104 first guide rail
106 second guide rail
108 first slider
110 second slider
112 cross-brace
114 first brace
116 second brace
118 first cable
120 second cable
122 drum housing
124 motor
126 pulleys
128 robotic arm
130 first end portion of first brace
132 second end portion of first brace

134 third end portion of second brace
136 fourth end portion of second brace
138 drum housing attachment
140 upper end region of first guide rail
142 lower end region of first guide rail
144 upper end region of second guide rail
146 lower end region of second guide rail
148 medial region of first guide rail
150 medial region of second guide rail
152 slots for robotic arm
154 first side of first guide rail
156 second side of first guide rail
158 first side of second guide rail
160 second side of second guide rail
162 closure attachment members
164 bent portion in cross brace
166 flat in first brace
168 drum housing attachment
170 flat in second brace
172 connection
174 end effector
176 window regulator
178 cross-brace
180 drum housing
182 first arm
184 second arm
186 third arm
188 fourth arm
190 attachment brace
192 rivet
194 push-in fastener
196 screw
198 outer panel
200 inner panel
202 first cross member
204 second cross member
206 third cross member
208 opening
210 inner periphery of opening

What is claimed is:

1. A window regulator for use in a vehicle and configured to move a windowpane between an open position and a closed position, the window regulator comprising:

a first guide rail;

a second guide rail;

a first slider;

a second slider, the first slider configured to move along the first guide rail and the second slider configured to move along the second guide rail to collectively move the windowpane between the open position and the closed position;

a drum housing;

one or more cables operatively connected to the drum housing and the first and second sliders;

a motor fixed to the drum housing and configured to wind and unwind the one or more cables to move the first and second sliders, a cross-brace assembly extending between and rigidly connecting the first guide rail to the second guide rail, wherein the cross-brace assembly includes, a first brace including a first end portion and a second end portion, the first end portion fixed to an upper end region of the first guide rail and the second end portion fixed to a lower end region of the second guide rail, and a second brace including a third end portion and a fourth end portion, the third end portion fixed to an upper end region of the second guide rail and the fourth end portion fixed to a lower end region of the first guide rail, wherein the first brace and the second brace intersect one another and are fixed to the drum housing;

a first pulley fixed to the upper end region of the first guide rail; and a second pulley fixed to the lower end region of the second guide rail, wherein the first guide rail includes a medial region extending between the upper end region and the lower end region of the first guide rail, wherein the medial region defines one or more slots configured to receive an engagement member of a robotic arm configured to fix the window regulator to a door panel of the vehicle, and wherein the first guide rail and the second guide rail each include a first side and a second side, the second side opposing the first side, wherein the first guide rail and the second guide rail each include second pulleys disposed on the first side, and the first end portion of the first brace is disposed on the second side of the first guide rail, wherein at least one of the first and second end portions is detachably connected to at least one of the first guide rail and the second guide rail.

2. The window regulator of claim 1, wherein the at least one of the first and second end portions is connected to the at least one of the first and second guide rails by a friction fit.

3. The window regulator of claim 2, further comprising:

a push-in fastener, wherein the push-in fastener is configured to detachably connect the at least one of the first and second end portions to the at least one first and second guide rails.

4. The window regulator of claim 1, further comprising:

wherein the cross-brace assembly includes one or more arms integral to and extending from the drum housing.

* * * * *